(12) United States Patent
Korolev

(10) Patent No.: US 9,048,901 B2
(45) Date of Patent: Jun. 2, 2015

(54) WIRELESS INTERFACE WITHIN TRANSMITTER

(71) Applicant: Rosemount Inc., Chanhassen, MN (US)

(72) Inventor: Eugene Korolev, Maple Grove, MN (US)

(73) Assignee: Rosemount Inc., Chanhassen, MN (US)

( * ) Notice: Subject to any disclaimer, the term of this patent is extended or adjusted under 35 U.S.C. 154(b) by 280 days.

(21) Appl. No.: 13/835,074

(22) Filed: Mar. 15, 2013

(65) Prior Publication Data

US 2014/0273895 A1 Sep. 18, 2014

(51) Int. Cl.
*H04B 1/04* (2006.01)
*G08C 17/02* (2006.01)
*G06K 19/07* (2006.01)

(52) U.S. Cl.
CPC ............. *H04B 1/0475* (2013.01); *G08C 17/02* (2013.01); *G06K 19/0717* (2013.01)

(58) Field of Classification Search
CPC ... H04B 1/0475; G08C 17/02; G06K 19/0717
USPC .......... 455/114.2; 73/753; 340/870.3
See application file for complete search history.

(56) References Cited

U.S. PATENT DOCUMENTS

| 2,533,339 | A | 12/1950 | Willenborg |
| 3,012,432 | A | 12/1961 | Moore et al. |
| 3,218,863 | A | 11/1965 | Calvert |
| 3,232,712 | A | 2/1966 | Stearns |
| 3,249,833 | A | 5/1966 | Vosteen |
| 3,374,112 | A | 3/1968 | Danon |
| 3,557,621 | A | 1/1971 | Ferran |
| 3,697,835 | A | 10/1972 | Satori |
| 3,808,480 | A | 4/1974 | Johnston |
| 3,924,219 | A | 12/1975 | Braun |
| 4,008,619 | A | 2/1977 | Alcaide et al. |
| 4,158,217 | A | 6/1979 | Bell |
| 4,168,518 | A | 9/1979 | Lee |
| 4,177,496 | A | 12/1979 | Bell et al. |

(Continued)

FOREIGN PATENT DOCUMENTS

| DE | 3340834 A1 | 5/1985 |
| DE | 43 14 296 A1 | 3/1994 |

(Continued)

OTHER PUBLICATIONS

Notification of Transmittal of the International Search Report and the Written Opinion of the International Searching Authority, or the Declaration dated Apr. 17, 2014 in International Application No. PCT/US2014/013774, filed Jan. 30, 2014. 12 pgs.

(Continued)

*Primary Examiner* — Creighton Smith
(74) *Attorney, Agent, or Firm* — Westman, Champlin & Koehler, P.A.

(57) ABSTRACT

A process transmitter is configured to measure a process variable of an industrial process. The process transmitter includes a process variable sensor which senses the process variable and responsively provides a process variable sensor output. Sensor circuitry is coupled to the process variable sensor. A housing to encloses the sensor circuitry and the output circuitry. The sensor circuitry electrical couples to the housing. The sensor circuitry wirelessly communicates with the output circuitry.

21 Claims, 3 Drawing Sheets

(56) References Cited

U.S. PATENT DOCUMENTS

| | | |
|---|---|---|
| 4,227,419 A | 10/1980 | Park |
| 4,287,553 A | 9/1981 | Braunlich |
| 4,322,775 A | 3/1982 | Delatorre |
| 4,336,567 A | 6/1982 | Anastasia |
| 4,358,814 A | 11/1982 | Lee et al. |
| 4,370,890 A | 2/1983 | Frick |
| 4,389,895 A | 6/1983 | Rud, Jr. |
| 4,422,125 A | 12/1983 | Antonazzi et al. |
| 4,422,335 A | 12/1983 | Ohnesorge et al. |
| 4,434,451 A | 2/1984 | Delatorre |
| 4,455,874 A | 6/1984 | Paros |
| 4,458,537 A | 7/1984 | Bell et al. |
| 4,490,773 A | 12/1984 | Moffatt |
| 4,542,436 A | 9/1985 | Carusillo |
| 4,562,742 A | 1/1986 | Bell |
| 4,590,466 A | 5/1986 | Wiklund et al. |
| 4,670,733 A | 6/1987 | Bell |
| 4,704,607 A | 11/1987 | Teather et al. |
| 4,749,993 A | 6/1988 | Szabo et al. |
| 4,785,669 A | 11/1988 | Benson et al. |
| 4,860,232 A | 8/1989 | Lee et al. |
| 4,875,369 A | 10/1989 | Delatorre |
| 4,878,012 A | 10/1989 | Schulte et al. |
| 4,926,674 A | 5/1990 | Fossum et al. |
| 4,951,174 A | 8/1990 | Grantham et al. |
| 4,977,480 A | 12/1990 | Nishihara |
| 5,094,109 A | 3/1992 | Dean et al. |
| 5,168,419 A | 12/1992 | Delatorre |
| 5,194,819 A | 3/1993 | Briefer |
| 5,230,250 A | 7/1993 | Delatorre |
| 5,233,875 A | 8/1993 | Obermeier et al. |
| 5,329,818 A | 7/1994 | Frick et al. |
| 5,492,016 A | 2/1996 | Pinto et al. |
| 5,542,300 A | 8/1996 | Lee |
| 5,606,513 A | 2/1997 | Louwagie et al. |
| 5,610,552 A | 3/1997 | Schlesinger et al. |
| 5,637,802 A | 6/1997 | Frick et al. |
| 5,642,301 A | 6/1997 | Warrior et al. |
| 5,656,782 A | 8/1997 | Powell, II et al. |
| 5,665,899 A | 9/1997 | Willcox |
| 5,682,476 A | 10/1997 | Tapperson et al. |
| 5,705,978 A | 1/1998 | Frick et al. |
| 5,757,608 A | 5/1998 | Bernot et al. |
| 5,793,963 A | 8/1998 | Tapperson et al. |
| 5,851,083 A | 12/1998 | Palan |
| 5,870,695 A | 2/1999 | Brown et al. |
| 5,872,494 A | 2/1999 | Palan et al. |
| 5,899,962 A | 5/1999 | Louwagie et al. |
| 5,911,162 A | 6/1999 | Denner |
| 5,954,526 A | 9/1999 | Smith |
| 5,992,240 A | 11/1999 | Tsuruoka et al. |
| 6,038,927 A | 3/2000 | Karas |
| 6,236,096 B1 | 5/2001 | Chang et al. |
| 6,295,875 B1 | 10/2001 | Frick et al. |
| 6,487,912 B1 * | 12/2002 | Behm et al. ............ 73/753 |
| 6,593,857 B1 * | 7/2003 | Roper et al. ............ 340/870.3 |
| 6,839,546 B2 | 1/2005 | Hedtke |
| 7,681,456 B2 * | 3/2010 | Hausler ............ 73/717 |
| 7,975,394 B2 * | 7/2011 | Mollmer et al. ............ 33/366.23 |
| 2002/0011115 A1 | 1/2002 | Frick |
| 2006/0055006 A1 | 3/2006 | Orth et al. |
| 2006/0254911 A1 | 11/2006 | Lindmueller et al. |
| 2009/0314093 A1 * | 12/2009 | Hausler ............ 73/717 |

FOREIGN PATENT DOCUMENTS

| | | |
|---|---|---|
| DE | 10104582 A1 | 10/2001 |
| EP | 0524550 A1 | 7/1993 |
| WO | WO 9953286 A1 | 10/1999 |
| WO | WO 2010110113 A1 | 9/2010 |

OTHER PUBLICATIONS

First Notification to Make Rectification for Chinese Patent Application No. 201320409521.3, dated Oct. 23, 2013, 1 page.

"Wireless R & D Aims to Boost Traffic," by M. Moore, IntTech with Industrial Computing, Feb. 2002, pp. 40-41.

"System Checks Faraway Machines' Health," by J. Strothman, InTech with Industrial Computing, Feb. 2002, pp. 42-43.

Notification of Transmittal of the International Search Report or the Declaration, PCT/US2003/10403.

* cited by examiner

WIRELESS INTERFACE WITHIN TRANSMITTER

BACKGROUND

The present invention relates to process variable transmitters of the type used to measure process variables of industrial processes. More specifically, the invention relates to reducing the impact of electrical noise sensitivity when measuring a process variable in a process variable transmitter.

Process control loops are used in various industries to control or monitor operation of industrial processes. A process variable transmitter is typically part of the process control loop and is located in the field to measure and transmit a process variable to control room equipment. The process variable can include, for example, pressure, flow, temperature, etc. Some process control loops include a controller, such as a valve controller, which is controlled in response to the process variable sensed by the transmitter.

Process transmitters are frequently used in harsh, caustic environments or in environments containing potentially explosive gasses or mixtures. Therefore, in order to reduce the possibility of damage to internal components of the transmitter from the caustic environment and of internal circuitry causing an ignition of explosive gasses, a process transmitter typically includes an electrically conductive transmitter housing which can tightly seal the internal components.

The internal components located inside the transmitter, such as, for example, internal circuitry, are connected to one another by way of wired interconnections. In industrial settings, electromagnetic fields can be generated by nearby equipment. Those fields can introduce electrical noise into electrical circuitry in the transmitter when measuring a process variable. For example, it may be the case that noise may enter the measurement circuit in the transmitter and impact measurements taken by the transmitter. This can cause unwanted errors to be transmitted by the transmitter and inaccurate readings to appear in the measurements. This may then elicit the process transmitter to transmit erroneous measurements of the process variables, causing an inability to properly monitor the operation of the underlying industrial process.

SUMMARY

A process transmitter is configured to measure a process variable of an industrial process. The process transmitter includes a process variable sensor which senses the process variable and responsively provides a process variable sensor output. Sensor circuitry is coupled to the process variable sensor. A housing to encloses the sensor circuitry and the output circuitry. The sensor circuitry electrical couples to the housing. The sensor circuitry wirelessly communicates with the output circuitry.

DETAILED DESCRIPTION OF ILLUSTRATIVE EMBODIMENTS

The present invention provides a process variable transmitter with reduced sensitivity to electrical noise. In various aspects, the present invention is directed to a transmitter that reduces the effect of electrical noise when measuring a process variable and enhances the reliability of measurements carried out by sensor measurement circuitry by utilizing a sensor circuitry common connection that couples the sensor measurement circuitry directly to the transmitter housing. In further aspects, the invention provides a method and apparatus for reducing electrical noise in the transmitter by adapting a wireless interface architecture internal to the transmitter. One example of wireless communication internal to the transmitter is shown and described in U.S. Pat. No. 6,839,546, entitled "PROCESS TRANSMITTER WITH WIRELESS COMMUNICATION LINK" to Hedtke, which is assigned to Rosemount, Inc. of Chanhassen, Minn.

Figure 1:
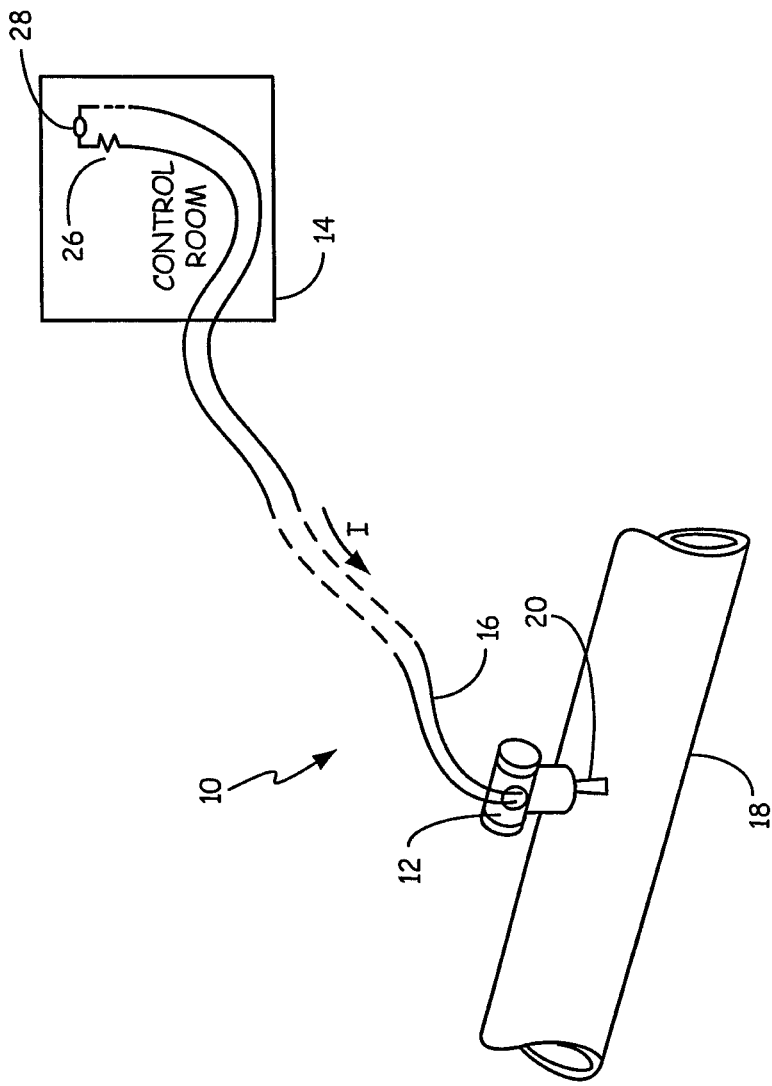
FIG. 1 shows a process control system in which a process transmitter of the present invention is used.

FIG. 1 shows a process control and monitoring system 10 configured to control and monitor an industrial process. Process system 10 includes a transmitter 12 coupled to a pipeline 18 and a control room 14 through a process control loop 16. In the illustrated embodiment, process transmitter 12 is coupled with piping 18 in which a process fluid flows. Process transmitter includes a process variable sensor 20, sensor circuitry 22, and output circuitry 24 (shown in FIG. 2) for generating an electrical signal based on a sensed process variable of the process fluid. The sensed process variable can include, for example, temperature, pressure, flow, fluid level, etc. Control room 14 includes communication system 26 (which can be modeled as a resistance) and power supply circuitry 28 (which can be modeled as a voltage source). In one embodiment, process control loop 16 is illustrated as a two-wire process control loop. In such a configuration, the same two wires are used both for carrying information as well as providing power to transmitter 12. For example, the transmitter 12 can control an analog current level on the two-wire loop 16 which is representative of the sensed temperature. However, the process control loop 16 can be in accordance with any format and is typically used to carry data as well as provide power to transmitter 12. In more advanced configurations, digital information can also be transmitted and/or received over the two-wire process control loop. One such protocol is the HART® communication protocol. Example process control loops include 4-20 mA loops, loops in accordance with the HART®, Profibus and Fieldbus standards. The present invention is not limited to two-wire implementations and any type of process control loop may be employed. Another example process control loop is a wireless process control loop in which information is transmitted wirelessly. One example of wireless communication technique is in accordance with the WirelessHART® communication protocol in accordance with the IEC 62591 standard. Ethernet fiberoptic connections, or other communication channels may also be used.

Figure 2:
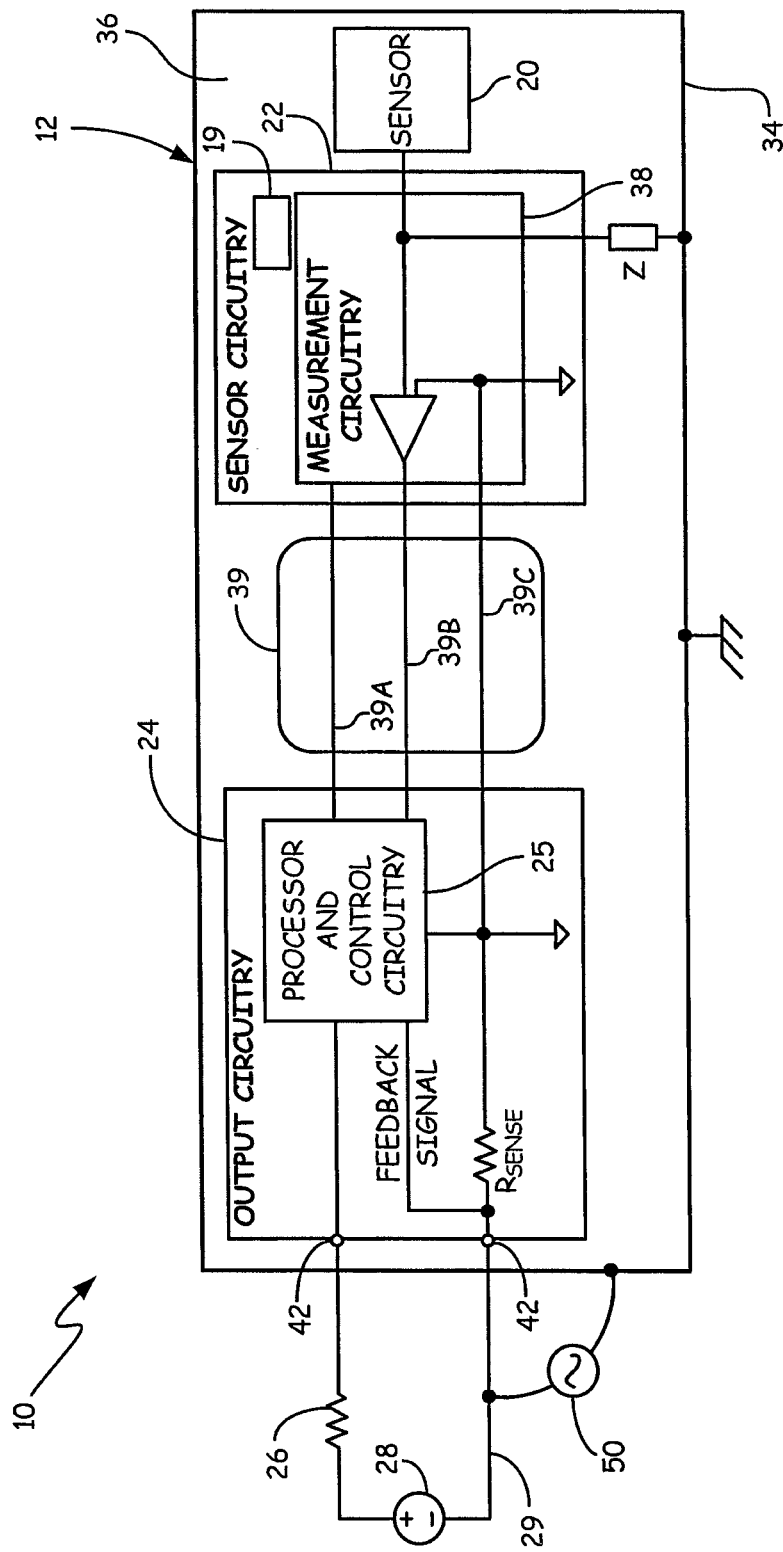
FIG. 2 is a simplified block diagram of a process transmitter including wired interconnections.

FIG. 2 illustrates an environment of a simplified field device that may experience electrical noise introduced by nearby radio transmitters or radio frequency equipment. As shown in FIG. 2, transmitter 12 includes a transmitter housing 34 which has a cavity 36. The cavity 36 is hermetically sealed to prevent caustic process fluids from entering cavity 36 and to further prevent ignition of flammable process fluids due to an energy discharge from circuitry within cavity 36. Sensor circuitry 22 and output circuitry 24 are carried in the cavity 36. Sensor circuitry 22 couples to the process variable sensor 20 which is configured to sense a variable of the process. Example sensors include temperature, pressure, flow and fluid level sensors. In operation, sensor circuitry 22 couples to sensor 20 and is used to sense and measure a process variable, such as pressure, temperature, flow, level, etc. In one embodiment, the transmitter 12 is powered completely from power received over the process control loop 16. Data related to the sensed process variable is transmitted over the loop 16, either in a digital or analog format, to control room 14 or to other equipment on the loop 16. In the embodiment illustrated, sensor 20 is located in cavity 36. However, in other exemplary embodiments, sensor 20 can be located outside the cavity 36.

The output circuitry 24 comprises a processor 25 configured to provide the measurement data to the control room 14. In one embodiment, loop 16 can supply all of the power consumed by the output circuitry 24 and sensor circuitry 22. In another embodiment, supply of some or all of the power consumed by output circuitry 24 and sensor circuitry 22 can be provided by an internal battery 19. The output circuitry 24 couples to the two-wire process control loop 16 through loop connections 42. Loop connections 42 are linked to a loop resistance 26 and power supply 28.

As shown in FIG. 2, the sensor circuitry 22 includes measurement circuitry 38 coupled to the sensor and configured to provide a transmitter output related to the process variable. An impedance Z is coupled between the measurement circuitry 38 and the housing 34. One technique for electrically isolating the measurement circuit 38 from electrical noise introduced by nearby radio transmitters or radio frequency equipment is to design the impedance Z such that it is infinitely high. In this case, when variable frequency voltage noise 50 is applied between the power supply minus lead connection 29 and the housing 34, there will be no path for the current to flow back to the housing 34 and the measurement circuit 38 will no longer be affected by the noise. However, designing the impedance Z to be infinitely high is difficult to achieve in practice. Further, the impedance Z will be reduced by, for example, stray capacitance. When voltage noise 50 is present in this configuration, the current has a return path to the housing 34 through output circuit common, interconnect circuit common 39C, sensor circuit common, operational amplifier virtual ground, the sensor signal, and impedance Z. Through this path, the voltage noise 50 present across the impedance Z can become mixed with the sensor signal. The voltage noise 50 introduces errors noise into the sensor signal, such errors in measurements carried out by the measurement circuit 38 are likely to occur.

Figure 3:
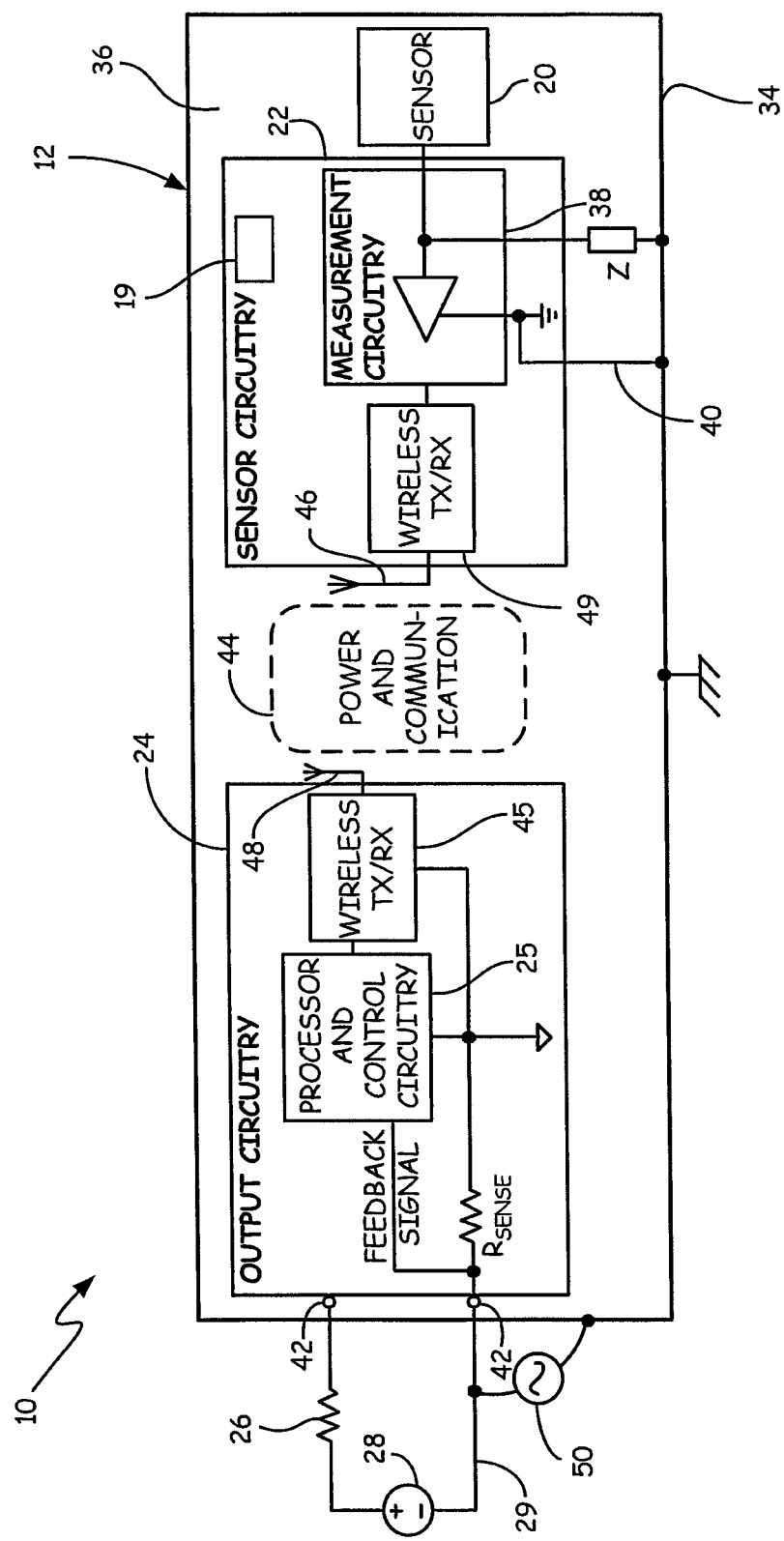
FIG. 3 is a simplified block diagram of a process transmitter including a process transmitter in accordance with aspects of the invention.

Another technique for electrically isolating the measurement circuit 38 from electrical noise introduced by nearby radio transmitters or radio frequency equipment is by way of a sensor circuitry common connection 40 that connects the measurement circuitry 38 directly to the housing 34. As shown in FIG. 3, the sensor circuitry common connection 40 can be used to shunt electrical current noise away from the impedance Z when variable frequency voltage noise 50 is applied between the power supply minus lead connection 29 in the power supply circuitry 28 and the housing 34. Therefore, measurements carried out by the measurement circuitry 38 should not be affected by the noise 50. This allows the measurement circuitry 38 to take proper measurements without any unwanted interference from the impedance Z. The measurement circuitry 38 then communicates the measurements to the process and control circuitry 25, which in turn provides the readings to the control room 14 via the process control loop 16.

If wired interconnections 39 (such as for example, power 39A, communication 39B and circuit common 39C) are used to connect the sensor circuitry 22 to the output circuitry 24, and a sensor circuitry common connection 40 connects to the housing 34, such a configuration could be susceptible to installation problems, thereby limiting the functionality of the field device. For example, when a field device is installed in a plant, it is common practice to electrically connect the housing 34 of the field device to the loop through the power supply minus lead connection 29. However, utilizing wired electrical paths to provide connections between the sensor circuitry 22 and the output circuitry 24 could cause connections in the output circuitry 24 to any point in the loop 16 (such as, for example, the connection to resistor $R_{sense}$) to be shorted. This, in turn, will cause the field device to function improperly or not function at all.

One configuration for achieving electrical isolation between the output circuitry 24 and the sensor circuitry 22 is by way of galvanic isolation (not shown). In this configuration, each signal line between the sensor circuitry 22 and the output circuitry 24 will be galvanically isolated. Galvanic isolation can be achieved using isolation transformers, optocouplers, capacitors, etc. Due to the large number of communication signals necessary to galvanically isolate each signal line, implementing this approach can be costly. Further, since this approach uses wired interconnects to isolate each signal line, the reliability of the field device is lessened.

In accordance with one aspect of the invention, a wireless communication link 44 shown in FIG. 3 is used to provide a communication link between the output circuitry 24 and the sensor circuitry 22. The wireless communication link 44 can be any type of link that does not require physical coupling. Examples include a radio frequency (RF) link, an inductive link, a capacitive link, an infrared (IR) link, a radio frequency identification (RFID) link, and other low-power, short-distance wireless communication technologies, such as near-field communication (NFC), ZigBee® and low energy Bluetooth® (BLE). Wireless communication link 44 is provided between an antenna 46, which couples to the sensor circuitry 22, and an antenna 48, which couples to the output circuitry 24. Wireless communication is provided by wireless communication circuits 45 and 49 which can be configured to transmit and/or receive information. The wireless communication link 44 can utilize radio frequency (RF) modules 45 (such as, a transmitter unit Tx) and 49 (such as, a receiver unit Rx) configured to transmit and/or receive the signals.

In accordance with embodiments of the present invention, elements 46 and 48 are illustrated as antennas but may comprise any type of transducer and may include, for example, capacitor plates or inductor elements. More specifically, if the communication link 44 is an RF link, transducers 46 and 48 can comprise antennas configured to send and/or receive radio frequency signals. The frequency and encoding of the RF signals can be selected as desired. Further, the shape and configuration of the antennas can be made to desired specifications, as well. In one embodiment, if the link 44 is an inductive link, elements 46 and 48 can comprise inductors which are placed sufficiently close to allow signal transmission therebetween. In a further embodiment, if the link 44 is inductive, inductive coupling through a resonance transformer can be used to transmit power wirelessly from output circuitry 24 to sensor circuitry 22 to recharge or eliminate battery 19. In addition, a wireless power receiver can be used to modulate a digital signal back to the wireless power transmitter 45, such that if single-ended communication is required, both power and communication can be integrated on a single wireless link. Further, if the link 44 is a capacitive link, transducers 46 and 48 can comprise capacitive plates.

If the wireless communication link 44 is configured for infrared (IR) configuration, the communication can be based on protocols set forth by the Infrared Data Association (IrDA). In one embodiment, an open window in the transmitter housing 34 can be used to allow IR signals to pass through.

In a further embodiment, the wireless communication link 44 can be configured for use with radio frequency identification (RFID) technology. Elements 45 and 49 can include a tag with an antenna tuned to an interrogator module. The RFID tag can be read only or read/write with data storage. In yet a further embodiment, a passive RFID tag configuration can be used. In the passive RFID configuration, an interrogator module generates an electromagnetic field such that the passive RFID tag can function by receiving power from the electromagnetic field. If the passive RFID tag is placed in the sensor circuitry 22 and the interrogator module is placed in the output circuitry 24, the RFID tag can be updated locally with sensor measurements and the interrogator configured to periodically read information back from the RFID tag.

Wireless communication link 44 can carry data at any desired data rate. Faster data transmission rates tend to have larger power requirements. The particular format of the data and protocols used on the wireless communication link 44 can be in accordance with standardized or proprietary formats. The information can be in an analog or digital format. The interface 44 can be uni-directional carrying data in one of the two directions between electronics 22 and 24, or can be a bi-directional, carrying data in both directions between the electronics 22 and 24. In embodiments where the circuitry 22 has sufficiently low power requirements, wireless communication link 44 can also power to the circuitry 22 such that that circuitry does not require a physical connection to the loop 16. The bi-directional transmissions can occur simultaneously or sequentially. Further, link 44 can be used to provide power to circuitry 22. For example, power from loop 16 can be used to power circuitry 22.

In a further embodiment, the transmitter housing 34 can be made out of a suitable metal material in order to protect the transmitter circuitry 22 and 24 from external wireless communication interference.

Although the present invention has been described with reference to preferred embodiments, workers skilled in the art will recognize that changes may be made in form and detail without departing from the spirit and scope of the invention. Although only a single sensor is shown, any number of sensors may be employed. The wireless communication can be uni-directional or bi-directional.

What is claimed is:

1. A process transmitter configured to measure a process variable of an industrial process, comprising:
    a process variable sensor configured to sense the process variable and responsively provide a process variable sensor output;
    sensor circuitry coupled to the process variable sensor;
    output circuitry configured to communicate with the sensor circuitry;
    a housing configured to enclose the sensor circuitry and the output circuitry;
    a sensor circuit common connection which couples the sensor circuitry to the housing thereby reducing noise in the sensed process variable; and
    a wireless communication link between the sensor circuitry and the output circuitry, wherein the wireless communication link wirelessly carries a data signal related to the process variable sensor output from the sensor circuitry to the output circuitry.

2. The process transmitter of claim 1, wherein the sensor circuitry is powered by an internal battery.

3. The process transmitter of claim 1, wherein the wireless communication link carries power from the output circuitry to the sensor circuitry.

4. The process transmitter of claim 1, wherein the housing comprises metal to shield the process transmitter from external interference.

5. The process transmitter of claim 1, further configured to connect to comprising a process control loop configured to carry data and provide power to the process transmitter.

6. The process transmitter of claim 3, wherein power is wirelessly transferred from the output circuitry to the sensor circuitry.

7. The process transmitter of claim 6, including a resonance transformer to wirelessly transfer power.

8. The process transmitter of claim 1, wherein the wireless communication link provides a wireless digital communication channel.

9. The process transmitter of claim 1, wherein the wireless communication link comprises an Infrared (IR) wireless link.

10. The process transmitter of claim 9, wherein the Infrared (IR) wireless link operates in accordance with an Infrared Data Association (IrDA) protocol.

11. The process transmitter of claim 1, wherein the wireless communication link comprises a radio frequency link.

12. The process transmitter of claim 11, wherein the radio frequency link comprises a radio frequency identification (RFID) link.

13. The process transmitter of claim 1, including a transmitter unit and a receiver unit configured to transmit and receive signals received using at least two transducers.

14. The process transmitter of claim 1 wherein the wireless communication is bi-directional.

15. A method of providing an output from a transmitter, comprising:
    coupling sensor circuitry to a process variable sensor configured to sense a process variable and responsively provide a process variable sensor output;
    providing transmitter output circuitry configured to communication with the sensor circuitry;
    enclosing the sensor circuitry and the transmitter output circuitry in a housing;
    coupling the sensor circuitry to the housing a sensor circuit common connection configured to reduce noise in the sensed process variable; and
    wirelessly transmitting a signal related to the process variable sensor output from the sensor circuitry to the transmitter output circuitry.

16. The method of claim 15, further comprising powering the sensor circuitry by an internal battery.

17. The method of claim 15, further comprising providing power to the process transmitter by a process control loop.

18. The method of claim 15, further comprising wirelessly transferring power from the output circuitry to the sensor circuitry.

19. The method of claim 15, wherein transferring power is through inductive coupling.

20. The method of claim 15, including transmitting and receiving signals using at least two transducers.

21. A process transmitter configured to measure a process variable of an industrial process, comprising:
    a process variable sensor configured to sense the process variable and responsively provide a process variable sensor output;
    sensor circuitry coupled to the process variable sensor;
    output circuitry configured to communicate wirelessly with the sensor circuitry, wherein the sensor circuitry is configured to communicate with the output circuitry;
    a housing configured to enclose the sensor circuitry and the output circuitry;
    a sensor circuit common connection which couples the sensor circuitry to the housing thereby reducing noise in the sensed process variable; and a wireless communication link between the sensor circuitry and the output circuitry, wherein the wireless communication link wirelessly carries a data signal related to the process variable sensor output from the sensor circuitry to the output circuitry.

\* \* \* \* \*